Oct. 29, 1929.    W. G. PONTIS    1,733,821
METHOD AND MEANS FOR COUNTERBALANCING SHAFTS
Filed July 6, 1926    2 Sheets-Sheet 1

Inventor
William Grant Pontis
By Spencer, Sewall & Hardman
Attorney

Oct. 29, 1929.  W. G. PONTIS  1,733,821
METHOD AND MEANS FOR COUNTERBALANCING SHAFTS
Filed July 6, 1926  2 Sheets-Sheet 2
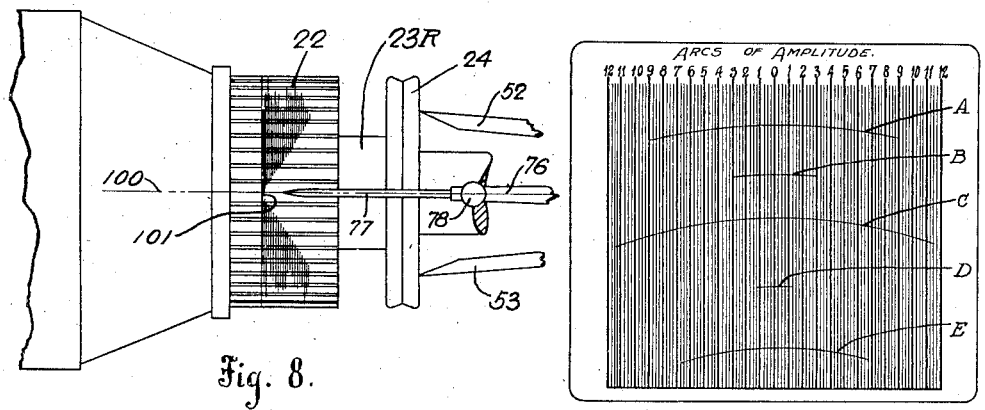
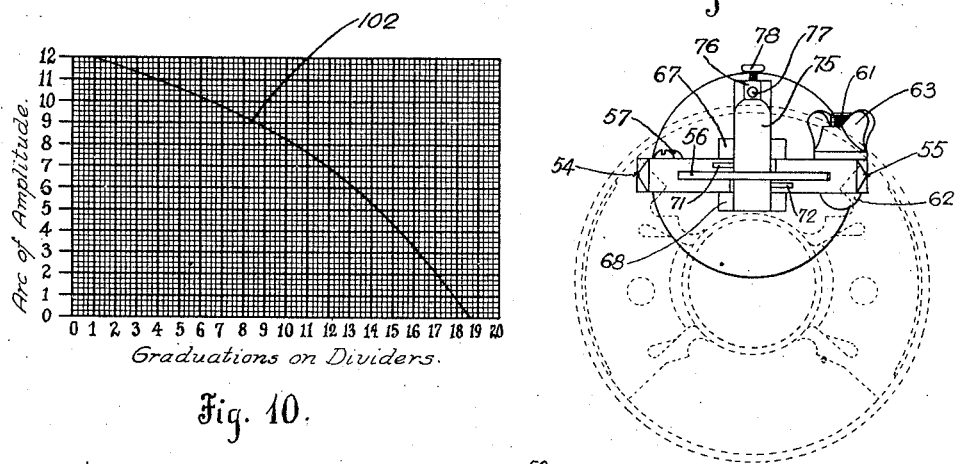
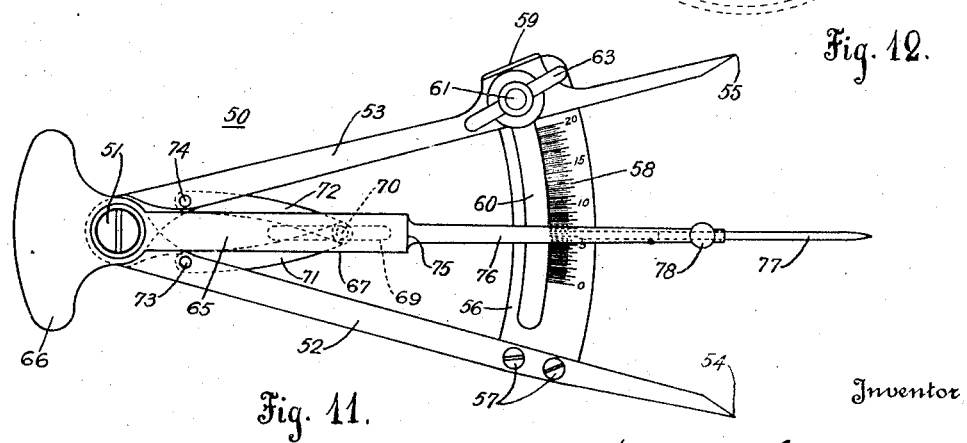
Inventor
William Grant Pontis
By Spencer, Sewall & Hardman
Attorney Patented Oct. 29, 1929

1,733,821

UNITED STATES PATENT OFFICE

WILLIAM GRANT PONTIS, OF DAYTON, OHIO, ASSIGNOR, BY MESNE ASSIGNMENTS, TO DELCO-REMY CORPORATION, OF DAYTON, OHIO, A CORPORATION OF DELAWARE

METHOD AND MEANS FOR COUNTERBALANCING SHAFTS

Application filed July 6, 1926. Serial No. 120,587.

This invention relates to improvements in the method and means for counterbalancing shafts.

It is among the objects of the present invention to facilitate the balancing of shafts by eliminating the "cut and try" process and substituting therefor a process based on mathematical predeterminations.

A further object is to simplify the manner of securing the counter-balancing weights to the shaft to be balanced.

Further objects and advantages of the present invention will be apparent from the following description, reference being had to the accompanying drawings, wherein a preferred form of embodiment of the present invention is clearly shown.

In the drawings:

Fig. 8 is a fragmentary view of the armature showing the markings on the commutator which indicate the lighter side of the armature and the location of the plane of unbalance.

Fig. 9 shows the chart on which is indicated several arcs of the amplitude of unbalance.

Fig. 10 illustrates a chart including a curve, plotted to show the correct spacing of the weights by means of the setting tool or "dividers" in accordance with varying amplitudes of unbalance.

Fig. 11 is a plan view of the setting tool or "dividers".

Fig. 12 is an end view of the dividers, with the balancing device including the weights in complete, neutralized positions, shown in "phantom" dotted lines.

Figure 1:
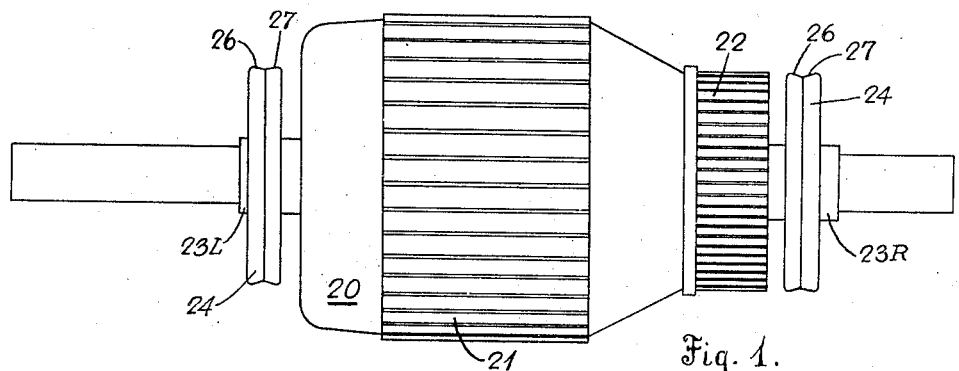
Fig. 1 is a side elevation of an armature upon the shaft of which are mounted the balancing devices.

Referring to the drawings the numeral 20 indicates an armature having a core portion 21 and a commutator 22, both carried on the shaft, the ends of which extend from the armature, the right end, as regards Fig. 1 being designated by the numeral 23R and the left end 23L. On each of these shaft portions 23R and 23L there is mounted a balancing device. This device comprises a cup-shaped retainer 24 having a central sleeve portion 25 which is press-fitted upon the respective shaft portions so as to mount the retainers securely on the shaft. At the outer-peripheral edge the retainer has a flange which in turn is provided with an inwardly extending edge 28 spaced from the body of the retainer. The flange comprises two angular portions 26 and 27 which slope toward the axial center of the retainer and converge centrally of the edge 28 and main body 30 of the retainer. The inner surface of the flange is knurled as at 29. Thus the portion of the retainer defined by the sleeve 25, main body portion 30 and the angular portion 26 of the flange define a receptacle for a pair of weights to be described, while the portions 25, 27 and 28 of the retainer together with the face of the weights already in the retainer define a second receptacle in the retainer for the second pair of weights.

Figure 5:
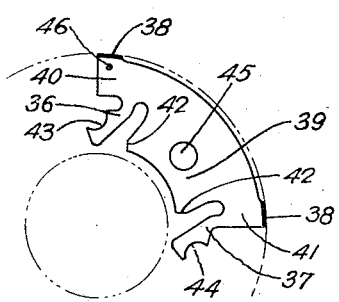
Fig. 5 is a plan view of one of the counter-balancing weights, showing the legs thereof in unbent positions.
Figures 6, 7:
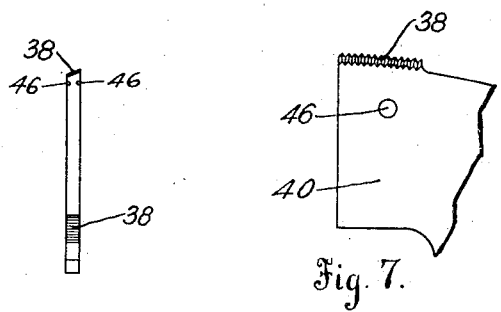
Fig. 6 is an edge view of the weight.
Fig. 7 is an enlarged detail, fragmentary view of the knurled edge of the weight.

Referring particularly to Figs. 5, 6 and 7, the weight is shown in the form of a segmental disc and comprising a main body portion provided with legs 36 and 37 adjacent each end thereof respectively. The outer circular edge has an extended portion 38 adjacent each end of the disc, each of said portions having a sloping edge as shown in Fig. 6, the angle thereof corresponding to the slope of portions 26 and 27 of the retainer. These portions 38 are knurled to correspond with the knurls of said portions 26 and 27.

Figure 2:
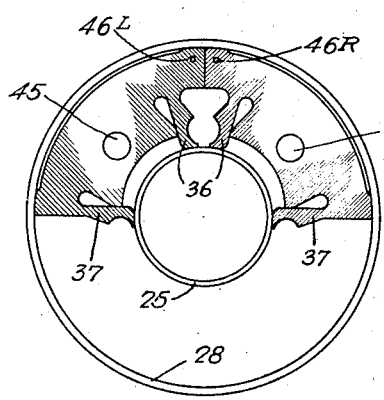
Fig. 2 is a front elevation of the balancing device showing the counter-balancing weights in the extreme counter-balancing position.
Figure 3:
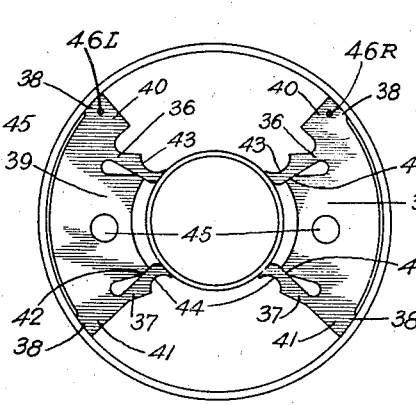
Fig. 3 is a view similar to Fig. 2, the weights however being shown in complete, neutralizing positions.
Figure 4:
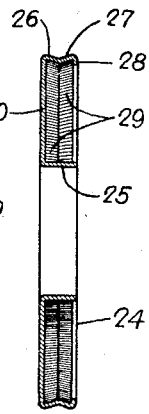
Fig. 4 is a cross-sectional view of the retainer cup.

The body portion of the weight comprises an inwardly extending portion 39, the inner edge thereof being formed so as not to engage with the sleeve 25 of the retainer when the weight is in position in the retainer. The corners of this portion are beveled as shown at 42. Shoulder portions 40 and 41 extend in opposite directions from the main body portion 39 the legs 36 and 37 extending from said shoulder portions 40 and 41 respectively. These legs are so formed that a space is provided between each of the legs and the portion 39 of the body of the weight. The outer edges of the legs 36 and 37 are provided with notches 43 and 44 respectively. These legs are of such length that they will not engage the sleeve 25 when the weights are placed in position in the retainer but do engage said sleeve after the legs are bent to clamping position as shown in Figs. 2 and 3.

An aperture 45 is provided in the weight, substantially midway between the ends thereof for purposes to be described. The numeral 46 designates an indent provided in the weight, this indent being spaced from the end of the shoulder 40 at a predetermined distance.

Setting dividers, designated as a whole by the numeral 50 and illustrated in Figs. 8, 11 and 12, comprise a pivot screw 51 which pivotally connects the two legs 52 and 53 and the indicator arm 77.

Each leg 52 and 53 is provided with a pointed end 54 and 55 respectively. The ends are so shaped that when the legs are moved together so that their inside edges engage, the points will be spaced apart a distance equal to the distance between the indents 46R—46L of the weights when they are in the extreme counter-balancing position as shown in Fig. 2.

An arcuate scale-plate 56 has its one end secured to the leg 52 by means of screws 57 while the other end of the plate extends through a slot in the leg 53. The scale-plate is provided with a graduated scale 58 including twenty, quartered spaces so arranged that the indicating edge 59 on leg 53 will align with the zero scale-line when the two legs 52 and 53 are brought together. The scale-plate 56 has a slot 60 arcuated with the center of the pivot screw 51 as a center. The enlarged portion of the leg 53, which includes the indicating edge 59, is slotted to receive the plate 56. A stud 61 having a head 62 engaging one side of the leg 53 extends through a passage in the leg, the stud passing through the slot 60. A wing nut 63 is provided on the stud said nut being adapted to clamp the slotted portion of the leg together for securing the leg to the scale plate and thus locking the dividers in adjusted position.

The indicator arm includes a recessed portion 65 the one end of which has the knob 66 formed thereon. This recessed portion comprises spaced arms 67 and 68 between which the legs 52 and 53 are positioned, the screw 51 acting as a securing means for these elements as well as a fulcrum member. A slot 69 is formed in the inside surface of each arm 67 and 68 respectively said slots being directly opposite and providing a track in which the pin 70 can slide. To this pin is anchored the one end of each of the aligning levers 71 and 72 the other ends of said levers being connected to their respective legs as at 73 and 74 respectively. These levers will maintain the indicator arm midway between the legs of the dividers at all adjustments thereof.

The two arms 67 and 68 of the recessed portion 65 are connected together by the end wall 75 from which extends the member 76, hollow for a portion of its length. The indicator pointer 77 is slidably supported in this member 76, a screw 78 being provided in the member for securing the pointer in any desired length adjustment. The pointer 77 lies in a plane sufficiently above the plane passing through the ends 54 and 55 of legs 52 and 53 respectively, so that the pointer will be positioned above the retainer 24 and commutator of the armature when the points of the divider are inserted in the indents of the weights for adjustment purposes. This is clearly shown in Fig. 12. The dividers described above have been illustrated, described and claimed in the copending application of Walter W. Riedel, filed Feb. 23, 1927, Ser. No. 170,230.

Applicant's process of balancing shafts, particularly armatures, involves the use of pairs of weights in each balancing device. All of the weights are of standard size and shape for armatures of a certain size.

Ordinarily, when balancing shafts the operator will add weight to the lighter side of the shaft and then test the shaft for balance. If the weight added proves insufficient, more is applied. After each change of weight, balance tests are made. This necessitates numerous tests which consume time and are costly, especially in the commercial production of armatures, which, if they are not properly balanced, will be noisy in operation.

Applicant does not use this cut and try method, but established a process by which the distribution of the counter-balancing weight is made to a mathematical certainty.

The first test of the armaure is for the purpose of establishing the amplitude of unbalance, the plane of unbalance and the lighter side thereof. Any well known dynamic balancing machine, which indicates or records the amplitude and plane of unbalance as well as the lighter side of the armature may be used. In the drawings the plane of unbalance is designated in Fig. 8 by the pointed indicative 101 on the armature made by the machine during alternately reverse rotations of the armature while in the machine. The line 100 designates the plane of unbalance and the point 101 the lighter side portion of the armature.

In the Fig. 9, the machine indicatives of the amplitude of unbalance are in the form of arcs on a chart having graduations from one to twelve. Several arcs are shown, arc A indicated 9 to 9—, arc B indicated 3 to 3, C—11.5 to 11.5, D,—1.25 to 1.25, E—6.75 to 6.75.

A chart as illustrated in Fig. 10, is provided, having graduations corresponding to the graduations of the chart of Fig. 9, arranged in one direction thereon, while graduations corresponding to those on the chart-plate 56 of the dividers 50 are arranged in the other direction on this chart.

Taking the armature having the amplitude of unbalance indicated by arc A in chart of Fig. 9, and placing adjustable weights in the receptacle mounted on the end tested previously, the weights are shifted and the armature tested after each such shift until this end of the armature is balanced. The points of the dividers are then inserted in the indents of the weights and the indication on the scale 58 noted. It will be found that this indication will be approximately 8.60. A mark is now made on the chart of Fig. 10, where the horizontal line 9 intersects the vertical line 8.60. Thus the weights of any armature having an amplitude of unbalance indicated as 9 to 9 will be spaced by the dividers set at 8.60. The other end of the armature is operated on in a similar manner. After the second end is balanced the first balanced end will be slightly out of balance. For this reason the retainers 24 are constructed to contain two sets of weights. The second set is placed in the retainer at the first tested end and a complete test is again made. In this way the armature may be brought to a substantially perfect balance.

An armature having an amplitude of unbalance as indicated by arc D will require its weights to be set approximately 17.63 on the dividers, arc C would require a setting of the dividers at 2.5. From this it may be seen that curve 102 on the chart of Fig. 10 may be developed which will indicate the position of the weights as determined by dividers for any amplitude of unbalance in any armature of the predetermined size. Other size armatures will require other size weights.

After the curve on chart of Fig. 10 has been established the balancing of armatures may be quickly and efficiently completed. If the operator finds an armature having an amplitude of unbalance indicated as 6.75 to 6.75 he refers to the horizontal line 6.75 on the chart of Fig. 10 and perceives where curve 102 intersects it. This is found to be 12.25. The dividers are set so that edge 59 will align with the line 12.25 then the wing nut is tightened to lock the dividers. The points 54 and 55 of the dividers are now placed in the indents 46L and 46R respectively thus spacing the weights. The weights are held in this spaced relation and moved about the retainer until the indicator pointer 77 aligns with the point 101 on the lighter side of the armature and in the plane of unbalance. Holding the weights in this position, the one jaw of a pair of pliers is inserted in the aperture 45 of one of the weights while the other jaw engages the notch 43 of leg 36. By means of the pliers the leg is bent so that its end will engage the sleeve 25 and thus clamp the knurled portion 38 into locking engagement with the knurled surface of the retainer. The other legs of the weights are similarly bent so that all of the weights are securely locked in adjusted position.

The weights of the second balance operation are adjusted and secured in the same manner. The beveled edges 42 of the portions 39 act as stops against which the legs are bent.

This construction reduces costs of production inasmuch as all weights are stamped from sheet stock of predetermined thickness and no screws or separate clamping elements are necessary to secure the weights in adjusted position in the retainers. These retainers are also of a simplified design. Testing is reduced to a minimum and instead of guessing the necessary balancing weight on each armature to be balanced, the distribution of the weight is made to a mathematical certainty.

While the form of embodiment of the present invention as herein disclosed, constitutes a preferred form, it is to be understood that other forms might be adopted, all coming within the scope of the claims which follow.

What is claimed is as follows:

1. A device for counter-balancing shafts comprising in combination, retainers secured to the shaft to be balanced; weights adjustably supported in said retainers, said weights including integral means adapted to secure the weights in adjusted positions in said retainers.

2. A device for counter-balancing shafts comprising in combination, cup-shaped retainers secured to the shaft to be balanced; a plurality of weights in each of said retainers, said weights being adapted to be moved together into proper positions in their respective retainers and having portions adapted to be bent into engagement with a retainer portion for clamping the respective weights in their proper positions.

3. A device for counter-balancing shafts comprising in combination, retainers annular in conformation secured to the shaft to be balanced; a plurality of segmental shaped weights slidably supported in the retainers and movable together into proper balancing positions; and legs formed on said weights, adapted to be bent into engagement with their respective retainers to secure the weights in their proper positions in said retainers.

4. A device for counter-balancing shafts comprising in combination, retainers secured to the shaft to be balanced; weights adjustably supported in said retainers said weights including recesses properly located, for receiving a locating tool; and means integral with said weights and co-operating with the retainers for locking the weights in proper adjusted positions.

5. A device for counter-balancing shafts comprising in combination, retainers secured to the shaft to be balanced; weights slidably supported in each of said retainers, so as to be movable into proper balancing positions, said weights including apertures intermediate their ends and notched legs at each of their ends, said apertures and notches providing anchoring means for a tool adapted to bend the respective legs into engagement with their respective retainers whereby to secure the weights in the proper positions.

6. A device for counter-balancing shafts comprising in combination, cup-shaped retainers secured to the shaft to be balanced, said retainers including a center sleeve portion adapted to fit snugly over the shaft, and also including a peripheral flange sloping toward the center and having a knurled, inside surface; a plurality of segmental shaped weights in each retainer, said weights having a portion of their circular edges beveled and knurled so as to fit the flanges of the retainer, and being adapted to be moved into proper balancing position; and means integral with the weights, adapted to be bent into engagement with the sleeve portion of the retainers whereby the weights are held securely in position in said retainers.

7. A device for counter-balancing shafts comprising in combination, cup-shaped retainers secured to the shaft to be balanced, said retainers each comprising a central sleeve and a plurality of weight receiving portions having their inside peripheral surfaces knurled; a pair of segmental shaped weights in each of said portions, said weights having their outer, circular edges knurled to fit the knurled surfaces of the said portions; and means provided on each of said weights, adapted to be bent into engagement with the respective sleeve of the retainer whereby the knurls of the weights are interlocked with knurled surface of their respective retainers to hold the weights in proper balancing position.

8. A device for counter-balancing shafts comprising in combination, cup-shaped retainers secured to the shaft to be balanced, said retainers including a central sleeve portion adapted to be pressed upon the shaft, and also including a body provided with peripheral flange having an inwardly extending edge, said flange comprising portions sloping toward the axis of the sleeve portion and converging centrally of the edge of the flange and the body of the retainer, the inner surface of the said sloping portions being knurled; a pair of segmental shaped weights in each portion of the retainers defined by the sleeve, body and one sloping portion and the sleeve, edge and the other sloping portion respectively, said weights having their outer, curved edges beveled and knurled to fit the knurls and the slope of the flange; and legs on said weights adapted to be bent to engage the sleeve portion of the retainer whereby the knurls of the weights and retainers are interlocked.

In testimony whereof I hereto affix my signature.

WILLIAM GRANT PONTIS.